Feb. 4, 1930.　　　　　E. JAHN　　　　　1,746,156
DEVICE FOR SEPARATING ADMIXED SOLID BODIES FROM FLUID STREAMS
Filed Oct. 16, 1928
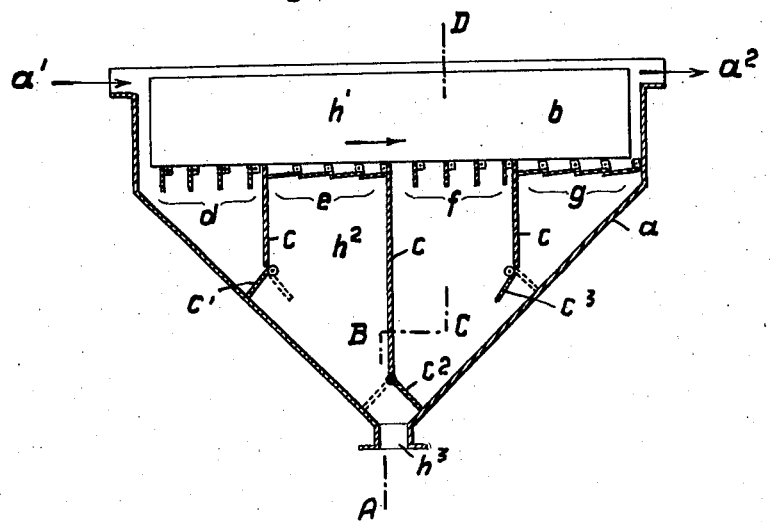
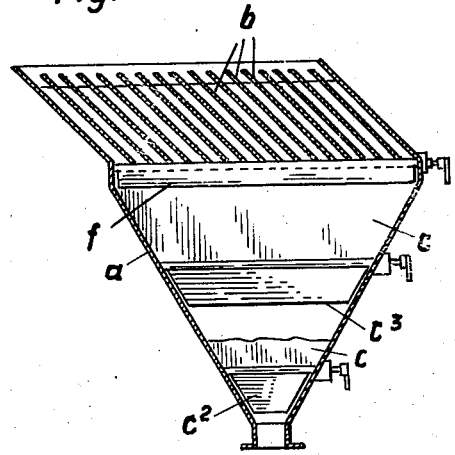
Inventor:
Ernst Jahn,
By Sturtevant & Mason,
Attorneys.

Patented Feb. 4, 1930

1,746,156

UNITED STATES PATENT OFFICE

ERNST JAHN, OF ARNSWALDE, GERMANY

DEVICE FOR SEPARATING ADMIXED SOLID BODIES FROM FLUID STREAMS

Application filed October 16, 1928, Serial No. 312,886, and in Germany June 26, 1928.

Devices are known for assisting the deposit of solid bodies from fluid mixtures under the influence of gravity, in which, by setting up inclined plates, the path of descent for the solid bodies is reduced to a fraction of the whole depth of fluid. The solid bodies which settle on the inclined plates slip down and fall off from the lower edges thereof. If now there is a current in the fluid underneath the lower edge of the plates, the solid bodies are again mixed with the fluid owing to the current, and the initial separation of the solid bodies from the fluid is destroyed. Also on account of the inclined plates the cross-section of the fluid is diminished, and the resistance is increased owing to the friction of the fluid with the top surfaces of the plates. Since the current seeks the path of least resistance, the fluid mixture flows only to a small extent through the plates, and flows for the most part underneath the plates to the outlet, and since the depth of fluid is relatively great, the solid parts cannot settle on the way until they reach the outlet, so that the object of the device, the separation of solid bodies from the fluid mixture cannot be attained. These disadvantages are obviated by the subject of the present invention.

With this object in view there is provided, according to this invention, a device for separating solid bodies from a fluid stream which carries them, in which the fluid flows through a container provided with inclined plates, characterized in that controlled sluices are provided in the collecting space under the plates, and are so controlled that at suitable time intervals they let through the separated solids to the solid outlet, and on the other hand prevent a fluid current under the plates.

In one example of carrying out the invention the sluices are so arranged that the collecting space under the deposit plates is so connected with the settling space and with the solid outlet by means of regulatable valves, that it can be opened or closed to one or the other in turn.

In a particular example the collecting space is divided into sluice chambers which are fitted with controlled groups of valves and which operate in turn, One embodiment is shown by way of example in the drawing in which:

Fig. 1 is a longitudinal cross-section parallel to the plates and to the direction of current;

Fig. 2 is a section on line A—B—C—D of Fig. 1.

In the container $a$ are fitted the obliquely disposed plates $b$, between which the fluid mixture runs from the inlet $a^1$ to the outlet $a^2$ parallel to the long edges of the plates. Under the settling space $h^1$ which contains the plates, partitions $c$ are fixed in the solid collecting space $h^2$ (in the drawing three partitions) and extend to the lower edges of the plates. At the lower edges of the partitions $c$ flaps $c^1$, $c^2$, $c^3$ are provided, rotatable from outside, which conform to the shape of the lower part of the container. Between the lower part of the container. Between the plates $c$ are groups of flaps $d$, $e$, $f$, $g$, likewise rotatable from outside, which are so arranged that in the top closed position they overlap one another and so cut off the plates $b$ from the lower part of the container $a$. The groups of flaps $d$, $e$, $f$, $g$, and the flaps $c^1$, $c^2$, $c^3$, are changed over from outside the device at definite time intervals in a suitable manner.

The method of operation is as follows:—

The groups of flaps $d$, $f$, are swung downwardly as at the instant illustrated in the drawing and open the way for descent of the downwardly slipping solid bodies, the groups $e$, $g$, are swung upwardly and prevent the stream from flowing downwards from the plates. The solid bodies slipping down above the groups of flaps $e$, $g$, remain on the flaps. The lower flaps $c^1$, $c^2$, $c^3$ are then in the positions shown in which the flap $c^1$ closes the space under the group $d$, the flap $c^2$ closes the space under the group $f$ while the flap $c^3$ is open. A downward stream cannot flow through the group of flaps $d$, since the flap $c^1$ is closed. Likewise, a downwardly directed stream through the group of flaps $f$ is not possible, since, even with the flap $c^3$ open, the path to the outlet of a possible stream through the groups of flaps $f$ and round the open flaps $c^3$ is obstructed by the closed group of flaps $g$.

The solid bodies slipping down through the open group of flaps $d$ and $f$ remain, those under the group $d$, lying over the closed flap $c^1$, those under the group $f$ lying over the flap $c^2$.

If, after a certain time interval, a change over is effected, the groups of flaps $d, f$ are swung upwardly, the groups $e, g$ opened, and the flaps $c^1$, $c^2$, $c^3$ are brought into the positions shown in dotted lines. The following then takes place:

The solids which have already passed through the group $d$ and which rested on the flap $c^1$ slip through the flap $c^1$ which is now open and rest on the flap $c^2$.

The solids which have passed through the group $f$, and which lay on the flap $c^2$, now pass through the solid outlet $h^3$. The solids deposited on the group of flaps $e$ now fall from the flaps $e$ now hanging vertically and remain above the flaps $c^2$, whilst the solids deposited on the flaps $g$ drop from them and remain above the flaps $c^3$. In this position of the flaps $d, e, f, g$, and $c^1$, $c^2$, $c^3$, no current can flow under the plates. The possible current through the open group of flaps $e$, round the flap $c^1$, has no outlet through the closed group of flaps $d$, likewise that through the open group $g$ on account of the closed flap $c^3$. The downwardly slipping solids now come to lie on the closed groups of flaps $d$ and $f$, whilst solids descend through the open groups $e$ and $g$ and remain over the flaps $c^3$ and $c^2$.

With the next change over of the groups of flaps, these return to the positions first described. The solids lying under the group $e$ on the flap $c^2$ are then admitted to the solid outlet $h^3$, and the solids which were lying over the flap $c^3$, in the second position of the flaps now slip down and lie over the flap $c^2$, so as to be admitted to the outlet at the next change over.

By the use of the above described flaps and their operation, the flow of a powerful current underneath the plates is prevented. Since also the whole of the fluid mixture to be separated can only flow between the plates, the acceleration of the settling process through the reduction of the distance through which the solid particles must sink is effectively accomplished.

Claims:—

1. In a device for separating from a fluid stream solid bodies carried therewith, a vessel including a settling chamber, a subdivided collecting chamber and a partition between said chambers, said settling chamber having inlet and outlet openings for the fluid, said subdivisions of the collecting chamber having outlet apertures at their bottoms leading to a common discharge for the separated bodies, independent flaps to close said outlet apertures, a plurality of plates located in said settling chamber and arranged parallel to one another and in the direction of flow of fluid through said settling chamber whereby a quiet flow in a straight line occurs, said plates being inclined to an acute angle to the horizontal, said partition being located immediately beneath said plates and comprising a plurality of groups of valves, each of said groups opening into a respective subdivision of the collecting chamber, and means to operate said flaps and groups of valves whereby one of said groups of valves may be opened for discharge while the flaps of said subdivisions and the succeeding group of valves are closed to prevent flowing fluid beneath said plates so that separated bodies are thereby withheld from re-entry into the stream.

2. In a device for separating from a fluid stream solid bodies carried therewith, a vessel having inlet and outlet openings for the fluid, a plurality of inclined plates between which the fluid passes, a plurality of sets of valves under said plates, a plurality of collecting chambers under said sets of valves respectively, and means for discharging solid matter from said collecting chambers without opening a path for the fluid underneath said plates.

3. In a device for separating from a liquid stream solid bodies carried therewith, a vessel having inlet and outlet openings for the fluid and a controlled discharge opening for solid matter, said vessel comprising a settling chamber provided with inclined plates disposed longitudinally of the direction of fluid flow, a plurality of collecting chambers communicating with said settling chamber by a plurality of corresponding sets of inlet valves, a set of discharge valves for discharging solid matter from said collecting chambers to said discharge outlet said sets of inlets and discharge valves being so operated in turn as always to prevent fluid flow underneath said plates.

4. In a device for separating from a liquid stream solid bodies carried therewith, a vessel having inlet and outlet openings for the fluid and a controlled discharge opening for solid matter, said vessel comprising a settling chamber provided with inclined plates disposed longitudinally of the direction of fluid flow, a plurality of small collecting chambers respectively communicating by means of valves with a plurality of larger collecting chambers, a plurality of sets of inlet valves for said collecting chambers, one set of inlet valves for one chamber, discharge valves for discharging solid matter from said larger collecting chambers to said discharge opening, said valves being so arranged and controlled in turn that there is no free path for the fluid underneath said settling plates.

5. In a device for separating admixed solids from a fluid stream, a vessel having inlet and outlet openings for said fluid and a discharge opening for deposited solids, said vessel comprising a settling chamber provided with a plurality of inclined plates disposed longitudinally of the direction of fluid flow, a collecting chamber of downwardly tapering form disposed under said settling chamber and divided into a plurality of compartments, a plurality of controllable, rotatable sets of inlet flaps forming the floor of said settling chamber, for admitting deposited solids into said compartments, a plurality of controllable, rotatable discharge flaps for discharging solids from said compartments, said sets of inlet and discharge flaps operating in turn so that for each compartment the set of inlet flaps is open whilst the discharge flap is closed, and so that some of said sets of inlet flaps are open whilst the remainder are closed, to prevent the opening of a free path of flow for fluid under said plates.

In testimony whereof I have signed my name to this specification.

ERNST JAHN.